United States Patent
Larson et al.

(10) Patent No.: US 6,963,796 B2
(45) Date of Patent: Nov. 8, 2005

(54) MODULARIZED POWER TAKE-OFF SYSTEMS FOR VEHICLES

(75) Inventors: Gerald L. Larson, Fort Wayne, IN (US); Colin J. Casey, Fort Wayne, IN (US); Charles E. Howard, Silver Lake, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 128 days.

(21) Appl. No.: 10/659,625

(22) Filed: Sep. 10, 2003

(65) Prior Publication Data

US 2005/0065684 A1 Mar. 24, 2005

(51) Int. Cl.[7] .............................................. G06F 17/00
(52) U.S. Cl. ............................. 701/36; 701/22; 701/69; 180/65.3; 318/139
(58) Field of Search ............................... 701/36, 22, 1, 701/69; 180/65.3; 318/139

(56) References Cited

U.S. PATENT DOCUMENTS

| | | | | |
|---|---|---|---|---|
| 5,627,438 A | * | 5/1997 | Barrett | ........................ 318/139 |
| 5,751,137 A | * | 5/1998 | Kiuchi et al. | .................. 322/14 |
| 6,272,402 B1 | | 8/2001 | Kelwaski | |
| 6,349,252 B1 | * | 2/2002 | Imanishi et al. | ............... 701/50 |
| 2001/0050471 A1 | | 12/2001 | McCoy et al. | |
| 2002/0007979 A1 | | 1/2002 | Wilson | |

FOREIGN PATENT DOCUMENTS

WO    WO 02/087053 A1    10/2002

\* cited by examiner

*Primary Examiner*—Tan Q. Nguyen
(74) *Attorney, Agent, or Firm*—Jeffery P. Calfa; Dennis Kelly Sullivan; Susan L. Lukasik

(57) ABSTRACT

A vehicle power take off system provides power for a variety of systems including a source of alternating current power for conventional electrical equipment to be powered by the vehicle. In a preferred electrical implementation, the power take off system is energized from the vehicle direct current electrical power system and generates alternating current of the desired voltage using a derectifier and step up transformer. Management of the system is implemented through modularized units which may be connected to communicate with another over a vehicle's controller area network. Load management may be monitored by an existing on board computer.

15 Claims, 10 Drawing Sheets

MODULARIZED POWER TAKE-OFF SYSTEMS FOR VEHICLES

BACKGROUND OF THE INVENTION

1. Technical Field

The invention relates to power take off systems for motor vehicles and more particularly to a modularized power takeoff system integrated into a vehicle's controller area network.

2. Description of the Problem

Utility and recreational vehicles are often advantageously supplied with auxiliary equipment powered by the vehicle. Such auxiliary equipment can be hydraulically powered, such as trash compacting equipment on refuse collection vehicles, pneumatically powered shop tools or electrically powered devices.

Auxiliary electrical equipment can include hand tools, light sources, medical instruments, computers, televisions, box fans, pumps and refrigerators. With regard to electrical equipment, it is generally cheaper to equip vehicles with conventional alternating current (A.C.) appliances rather than adapt appliances for operation off of vehicle 12 volt direct current (D.C.) power. Accordingly, vehicles requiring auxiliary electrical equipment have been provided with auxiliary electrical systems which, in North America, convert power from the vehicle's electrical system to 60 cycle, single phase A.C. electricity at 110 volts R.M.S. Of course, conversion of power to three phase 230 volt, or single phase 50 cycle power, are also possible.

Hydraulic and pneumatic devices require a pump to pressurize a working fluid. These pumps may be a pump used for another system such as a power steering pump on an air brake system pump, but they are typically dedicated, special purpose pumps driven by the engine or a transmission mounted "power take off" (PTO) pump.

Special purpose auxiliary equipment which translates vehicle output to operate equipment supports PTO operation. Generally PTO operation has been enabled at the election of the driver or operator through specialized operator controls. Vehicles equipped for PTO operation can sometimes demand increased engine output. It would be advantageous to fully integrate control functions and engine management for PTO operation for ancillary equipment with existing vehicle control systems.

The demand for PTO support has generally been met with after market accessories. The integration of these accessories into increasingly complex vehicle systems is less than ideal. Nor have these accessories been as reliable, light weight, or small as possible, or conveniently provided as much power as can be required without modification of a vehicle's hardware.

SUMMARY OF THE INVENTION

According to the invention there is provided system integration of ancillary or accessory equipment on a motor vehicle having a power source, such as a battery, generator or engine and a controller area network. Modular power units provide mechanisms for controlling or adapting the application of power output by the power source to the accessory equipment. The modular power unit communicates over the controller area network with existing vocational controllers such as instrument package controllers, which may be utilized to enhance, or provide, some of the required control.

One embodiment of the invention provides alternating current electrical power for the direct current battery charging system driven by the engine. A derectifier type modular power unit supplies alternating current from the D.C. power produced by a vehicle alternator or discharged by the battery. A management panel is coupled to the controller area network for communicating with the modular power unit and providing a user interface. The modular power unit includes a controller unit coupled for communication over the controller area network for receiving commands issued by the management panel.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
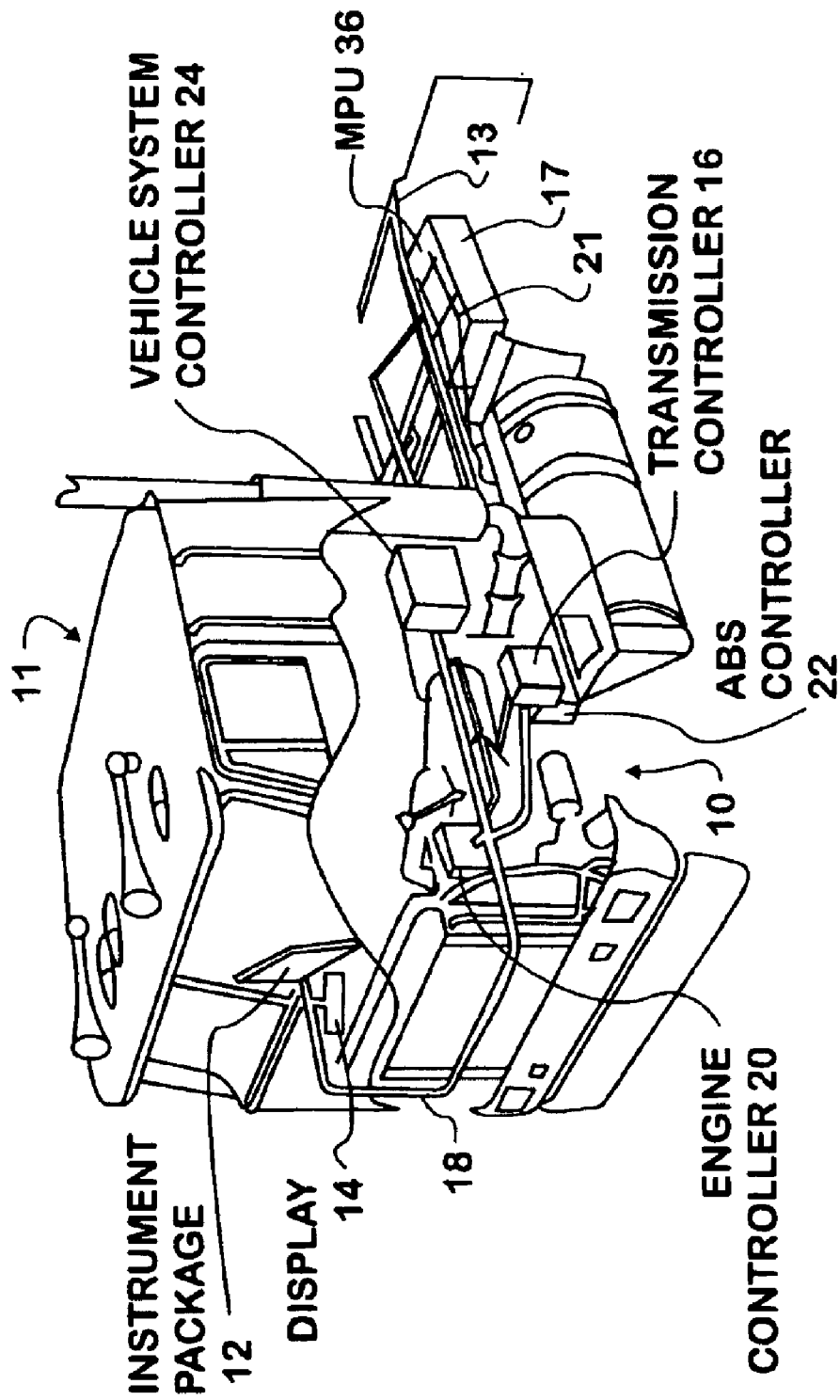
FIG. 1 is a perspective view in partial cutaway of a vehicle truck and an electrical system for the truck.

Referring now to the figures and in particular to FIG. 1, a perspective, partial cutaway view of a vehicle 11 illustrates a vehicle electrical control system 10 installed on the vehicle. Vehicle electrical control system 10 comprises a network having a network backbone comprising a twisted pair (either shielded or unshielded) cable operating as a data link or serial data bus 18. One node of bus 18 is a vehicle system controller 24, which is a major component of the vehicle electrical control system. Vehicle system controller 24 manages a number of vocational controllers connected to bus 18 as nodes. Vehicle system controller 24 also executes a load management program which oversees the total load imposed on the vehicle electrical system and power train by various accessories installed on the vehicle and by electrical and electronic devices energized by an electrical modular power unit (MPU) 36, which is located in a battery box 17. Electrical MPU 36 is one type of power take off device by which the invention is implemented. Electrical MPU 36 translates vehicle D.C. power into 110 volt, single-phase alternating current electrical power. Modularity is achieved by mounting the PTO device with respect to the vehicle frame rails. Battery box 17 offers a particularly advantageous location for electrical MPU 36 by being positioned on the frame rails and by bringing electrical MPU 36 into close proximity to the vehicle's batteries. Physically close proximity between electrical MPU 36 and the batteries minimizes the length of cables connecting the batteries to the electrical MPU. As a result $I^2R$ losses are reduced, a factor of considerable importance in some applications since electrical MPU 36 can draw a considerable amount of current.

Collectively, bus 18 and the various nodes attached thereto form a controller area network (CAN) conforming to the SAE J1939 protocol. Controller area networks are networks which do not have destination addresses for nodes attached to the networks, but rather provide for transmission of data in packets, identified as to the source, message type and priority. The nodes are programmed as to whether to respond to a packet based on one or more of the three identifiers. Many messages are predefined by the SAE J1939 protocol. However, the SAE J1939 protocol allows the definition of proprietary message types.

Active vehicle components are typically controlled by one of a group of autonomous, vocational controllers. The vocational controllers include an instrument package 12, a display 14, an engine controller 20, a transmission controller 16, an antilock brake system (ABS) controller 22 and electrical MPU 36, all of which are coupled to a serial data bus 18 for communication with one another and with vehicle system controller 24. The autonomous controllers include local data processing and may include programming. They are typically supplied by the manufacturer of the controlled component. For each autonomous controller there is a defined set of variables used for communications between the autonomous controller and other data processing components coupled to the network. Control of MPU 36 may be implemented through instrument package 12 or a specialized unit coupled to the network datalink 18.

The loads imposed on vehicle 11 systems and controlled by vehicle system controller 24 are usually electrical loads, however, they may include electronically controlled engagement of mechanical devices to the power train of vehicle 11. Gear selection in an automatic transmission would be an example of a system which affects the mechanical load on a vehicle power train. Other electrically controlled but non-electrical loads include a clutch controller with an air conditioning compressor, which may be deemed a non-critical load, allowing it to be shed if the load on the engine is too great. The load management program can, depending on power demands by components, request increased power output from the engine through engine controller 20, or shed loads to maintain power to a higher priority system if engine load limits have been reached. The modular power units of the present invention may impose an electrical load on engine 30 through charging system 47 or a direct mechanical load on engine 30. A vehicle load management program may advantageously be modified to accommodate handling these loads.

The modular power units of the invention take vehicle power and adapt it for application to particular tasks. The preferred application for the modular power units is in providing single phase, alternating electrical current. Electrical power for vehicle 11, its accessories and devices supported by MPU 36, can be supplied by one or more lead acid batteries 21, shown installed toward the rear of the vehicle in a battery box 17 hanging from a vehicle frame rail 13, or by an alternator, which is part of charging system 47. Electrical power from batteries 21 may be supplied upon moving a key switch from an off position to an on position, without cranking the vehicle engine 30, or from charging system 47 when the engine is running.

Figure 2:
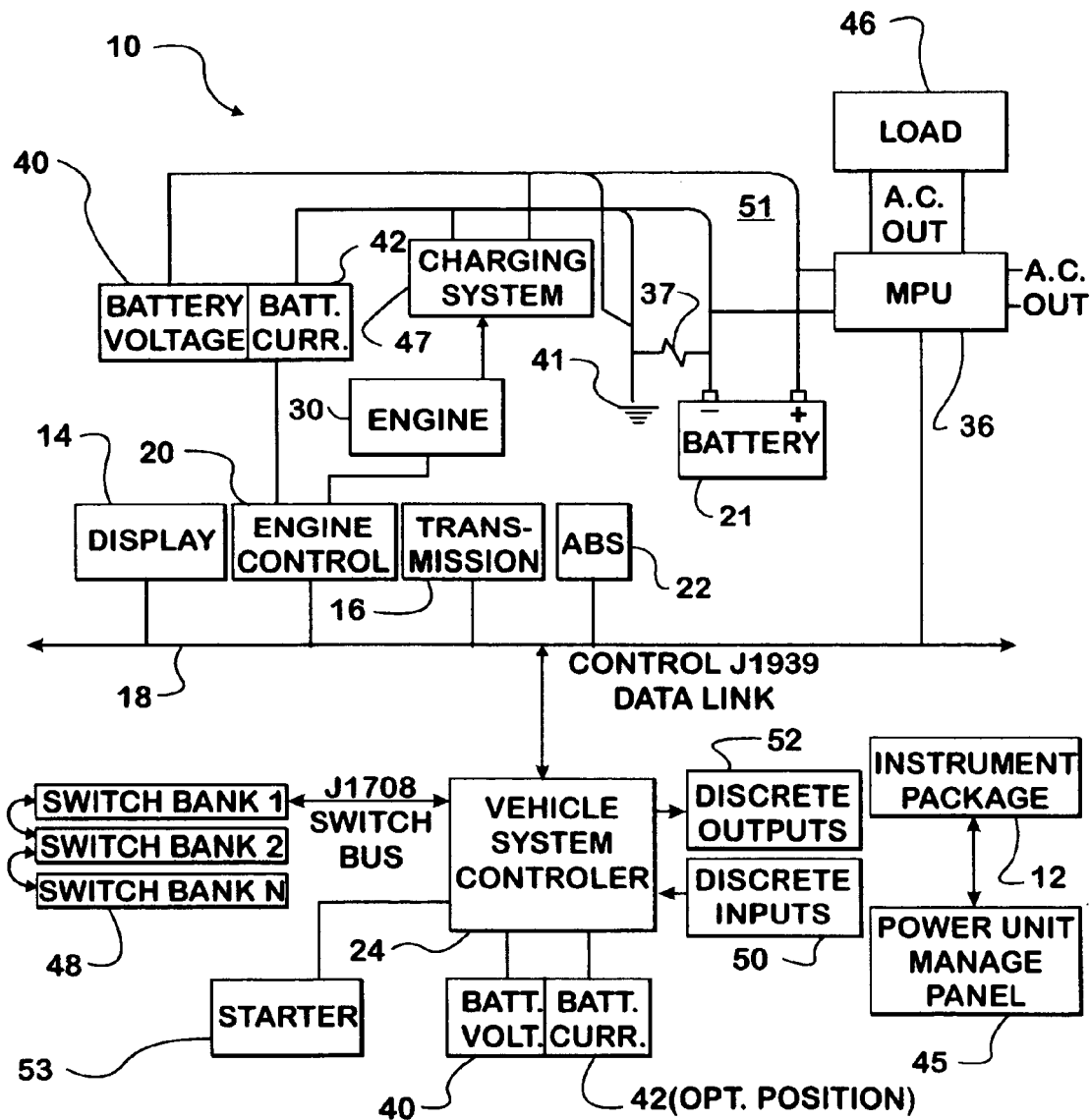
FIG. 2 is a block diagram of a controller area network, an electrical system and battery charging system used to implement the invention on a vehicle.

FIG. 2 is a block diagram schematic illustrating electronic control of a vehicle 11, based on a controller area network and vehicle system controller 24. As already mentioned, assorted controllers communicate with one another over a data link 18, which conforms to the SAE J1939 protocol. Local autonomous controllers may also receive data directly from switches and sensors, as vehicle system controller 24 does from a switch bank 48 and discrete input section 50, such as a on/off switch for a radio. Discrete inputs received by vehicle system controller 24 include ignition key switch position and start button position from starter 53. Each local controller may provide control or informational signals to local, discretely controllable components, as vehicle system controller 24 does with discrete output section 52, which may control, by way of example, vehicle lamps. The status of all switches may be provided other controllers over data link 18.

Engine controller 20 is commonly used to monitor a number of operational sensors on a vehicle 11 because of the immediate need of the engine controller for such measurements in controlling fuel flow to engine 30. Some of these measurements relate to battery condition monitoring and operation of the battery charging system 47. These measurements provide values for variables in a load management program executed by vehicle system controller 24. Engine controller 20 receives measurements from a battery voltage sensor 40 and a battery current sensor 42. Battery voltage sensor 40 and battery current sensor 42 are connected to terminals of a battery 21 to provide electrical output readings relating to battery performance and charging system output which are communicated to vehicle system controller 24 over bus 18. Alternatively, battery voltage and current sensors 40 and 42 may be connected to vehicle system controller 24 or may communicate with vehicle system controller 24 over bus 18. Battery voltage measurement requires connection across the negative (or chassis ground 41) and positive terminals of battery 21. Current measurement is made by measurement of the voltage drop along the length of the negative terminal battery cable, the resistance of which is represented by a resistor 37 connected between the negative terminal of battery 21 and chassis ground 41. The resistance of negative terminal cable 26 is a fraction of an ohm and thus a fraction of the internal resistance (IR) of battery 21. The effect of the battery terminal cable's resistance can be disregarded in measuring of the voltage difference between battery terminals.

Figure 4:
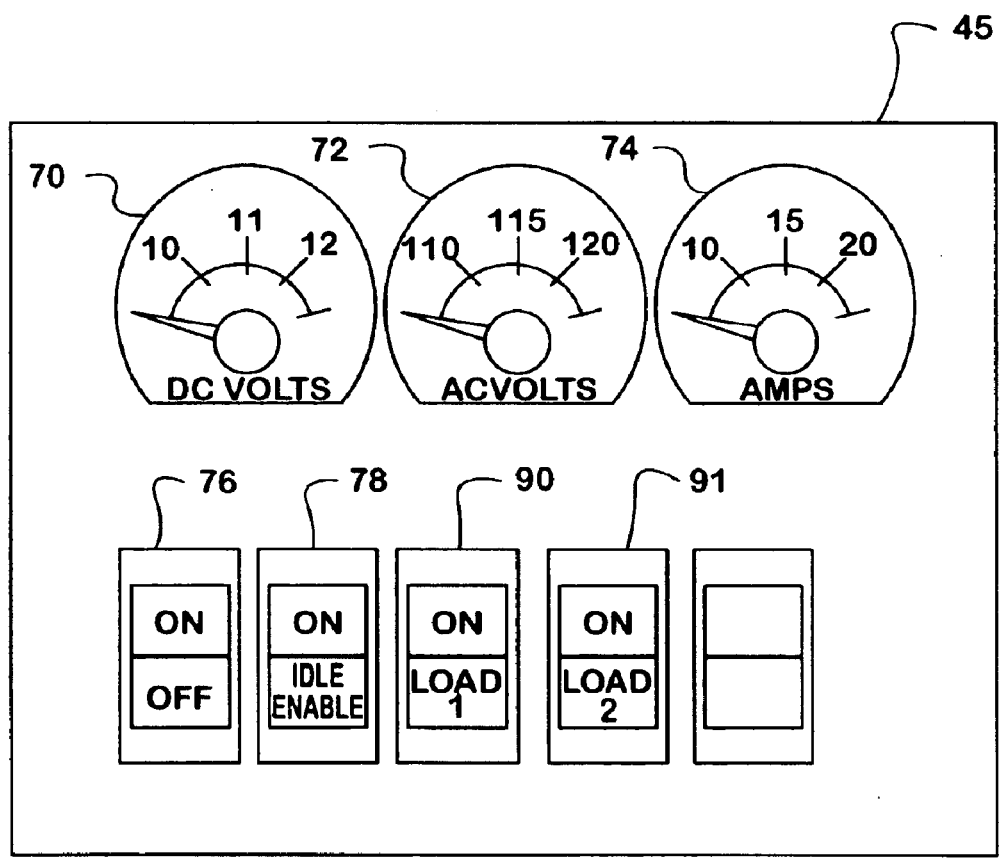
FIG. 4 is front view of a control panel used as an operator interface for management of the alternating current electrical system of the invention.
Figure 5:
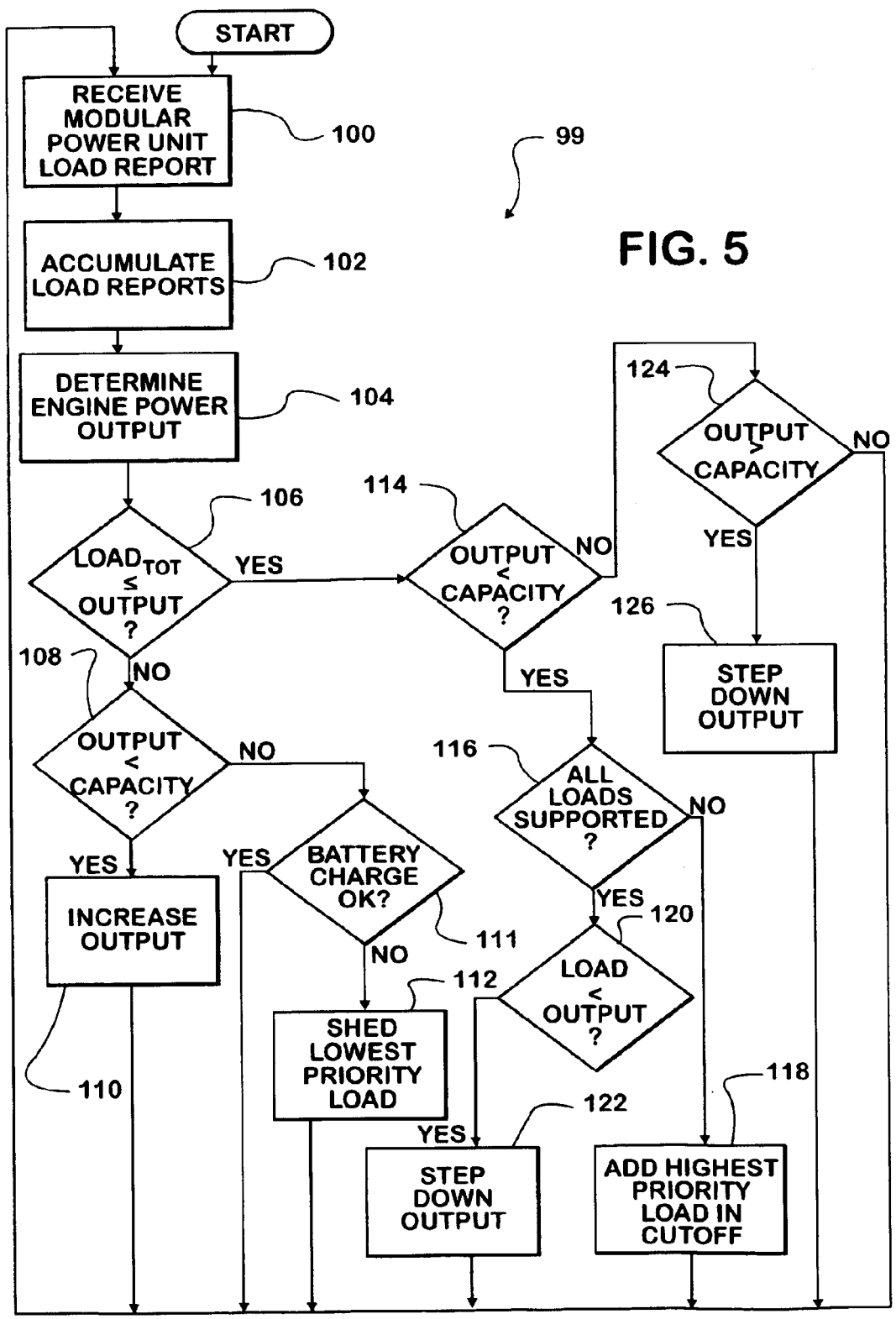
FIG. 5 is a flow chart of a load management program executed by a vehicle system controller or by an engine controller for a vehicle on which the invention has been implemented.

The vehicle electrical control system 10 includes other components used in practicing the present invention. Instrument package controller 12 provides a preferred point of connection to the controller area network for a modular power unit control panel 45 used to control MPU 36. Power unit management panel 45 is intended for installation in a vehicle dash or somewhere conveniently reached by a vehicle operator/driver. Referring to FIG. 4, it may be seen that control panel 45 provides an ON/OFF switch 76 for MPU 36. An idle enable switch 78 results in generation of a signal over bus 18 as to whether engine output may be varied as required to meet load. With engine idle enable switch 78 off, the engine controller 20 is not allowed to increase engine output beyond a low idle setting unless the operator uses the vehicle accelerator. When idle enable switch 78 is moved to the on position, high idle outputs are automatically available, being initiated by the vehicle system controller 24 in response to changes in load. Load ON/OFF selection switches 90, 91 turn particular A.C. outlets on and off. A D.C. volt gauge 70 allows the operator to determine directly if the vehicle electrical system is supporting the load. A.C. volt gauge 72 and ammeter 74 indicate the cumulative load from the circuits activated by load switches 90, 91.

Under the indirect control of the engine controller is a charging system 47, which is used to recharge battery 21 and to supply direct current electrical power to vehicle systems. Engine controller 20 can be used to increase output from engine 30 in response to a request from vehicle system controller 24 generated in response to execution of a load management program.

MPU 36 communicates with other autonomous local controllers over data link (bus) 18, and is connected to receive direct current electrical energization from vehicle D.C. electrical system 51, supported by battery 21 and battery charging system 47. MPU 36 converts the direct current power to alternating current power and provides alternating current on A.C. outlets 365, 366 to A.C. loads such as load 46.

Figure 3:
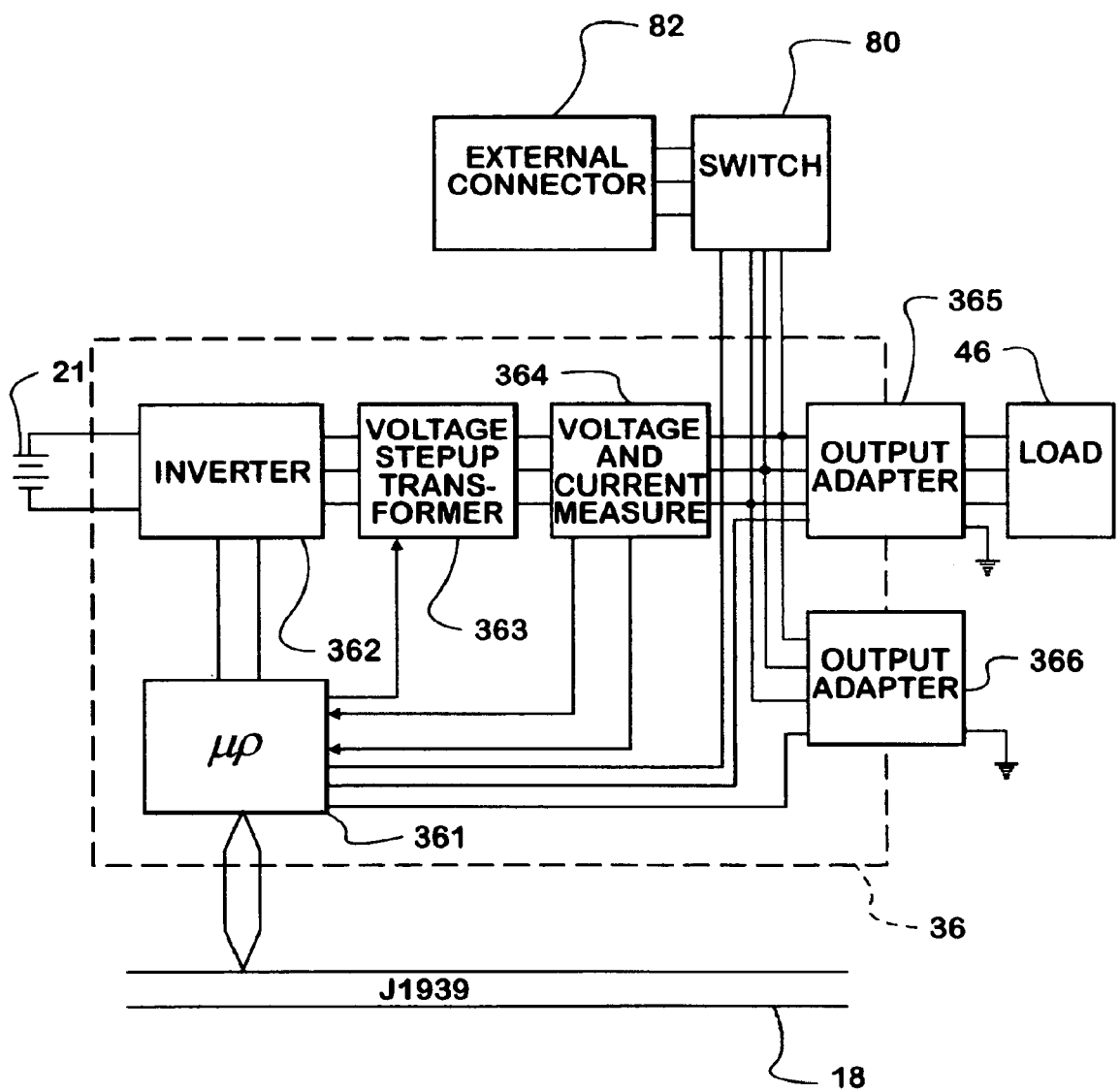
FIG. 3 is a block diagram of a modular power unit used to implement the power take off alternating current electrical system of the invention.

Referring to FIG. 3, an electrical modular power unit 36 is illustrated in greater detail. Modular power unit 36 provides alternating current at a voltage and at a hertz selected by the customer upon installation of the system or, if desired, at variable frequencies as required by the application. Typically, the alternating current provided by MPU 36 conforms to standard household power in the market where the vehicle is sold. In North America an electrical MPU will typically be configured to provide single phase, 60 cycle, 110-volt power. Alternatively, 230 volt or three-phase power may be provided. Fifty cycle, 210-volt power is as easily implemented as 60 cycle, 110-volt power. Output sockets (adapters) 365 and 366 are provided as required for plugs used with the selected power. The central elements of modular power unit 36 are a power inverter (derectifier) 362 and a voltage step up transformer 363. Direct current power is provided on inputs to inverter 362 and alternating current (single phase or three phase) is provided at outputs from the inverter at the desired frequency. The frequency of operation is determined by the programming of microprocessor/microcontroller 361, which also handles communications to and from data link (bus) 18. Inverter 362 may include wave-shaping circuitry as desired, for example to obtain a clean sinusoidal output voltage. Microprocessor 361 receives signals over bus 18 indicating which, if any, of the power output adapters 365, 366 to activate. Microprocessor 361 also receives inputs from line to line voltage and current measures from sensor package 364. This data is packetized and broadcast on datalink (bus) 18. Microprocessor 361 may be programmed to control switching in step up transformer 363 to determine the number of windings engaged in the primary and secondary windings of the transformer to determine the output voltage.

It may be desirable to allow output adapters 365 and 366 to be connected to an outside source of line power. With MPU 36 off, inverter 362 will not operate. However, output adapters 365, 366 may still be switched on and an external source of alternating current connected to external connector 82. Output adaptors 365, 366 can then be turned on by microprocessor 361 and the output adaptors used normally, without drawing vehicle power. Such an option may be useful where an external power source is available, line power typically being much cheaper than power generated on board a vehicle. Switch 80 may be connected to be operated by microprocessor 361. It is preferable that switch 80 is never closed when inverter 362 is operating, there typically being no measures taken to assure precise phase and frequency matching between an external line source and the output of inverter 362, although, of course, providing such is feasible at greater expense. A load 46 may be connected to either or both output adapters 365, 366.

When loads 46 are being energized on internal vehicle power, a load management program can be executed, preferably by vehicle system controller 24. Load management program 99 is executed as a continuous loop. Upon activation (start), the program begins with receipt of a modular power unit load report (step 100). With step 102, additional load reports are collected from other vocational controllers (for example, engine torque output from a transmission controller 16) or generated from data inputs. Next, at step 104, engine power output is determined (which may range from 0 if the vehicle is off, to tens of kilowatts). At step 106, total load is compared to engine output. If the total load is not less than or equal to engine output (i.e. load exceeds engine output), the program advances to step 108 to determine if engine output is less than engine capacity. If engine output is below engine capacity, power output is increased (step 110) following the YES branch from decision step 108. Engine capacity may be an arbitrary or selectable limit. For example, engine capacity depends upon whether idle enable is on or off.

If output is equal to or exceeds engine capacity, the NO branch is taken from step 108. It may be noted that engine capacity equals zero if the engine is not on (i.e. load 46 is being powered from battery 21). Execution advances to step 111 where it is determined if the battery charge is still at an acceptable level and if the discharge rate is not excessive. Battery 21 charge can be extrapolated from battery condition from any number of battery condition monitoring programs, such as disclosed in U.S. Pat. No. 6,417,668. The discharge rate may be set as preprogrammed limit. If the battery is being used too heavily or has become too greatly depleted, step 112 is executed to shed the lowest priority load. For example, vehicle running lights may be turned off if it is daytime or it the vehicle is not moving (as determined from the transmission controller and system clock). If the power drain is not severe, the program allows all loads to be sustained for a time. After steps 110, the YES branch from step 111 or after execution of step 112, program execution returns to step 100. Alternatively, the program can include steps to turn on the engine for a time to recharge the battery. The limits applied in these steps depends upon if the idle enable switch is closed.

Where, in step 106 load was determined to be less than or equal to engine output, the program advances along the YES branch to step 114, where it is determined if engine output is less than capacity. If it is determined that output is less than the engine's capacity for sustaining the output at step 114, step 116 is executed to determine if all requested loads are being supported. If they are not, the highest priority load in cutoff is restored at step 118. If all loads are already being supported, it is determined at step 120 if the total load is less than engine output (120). If load is less than output engine output is stepped down along the YES branch with execution of step 122. Otherwise, following the NO branch from step 120 or after step 122 or 118, program execution returns to step 100.

Where, at step 114, it is determined that engine output equals or exceeds capacity, the NO branch is taken to step 124, where it is further determined if output exceeds engine capacity (e.g. the engine is running in a red line area or fuel flow exceeds a limit). If YES, engine output is stepped down at step 126 and program execution returns to step 100. If NO, program execution returns immediately to step 100.

Figure 6A:
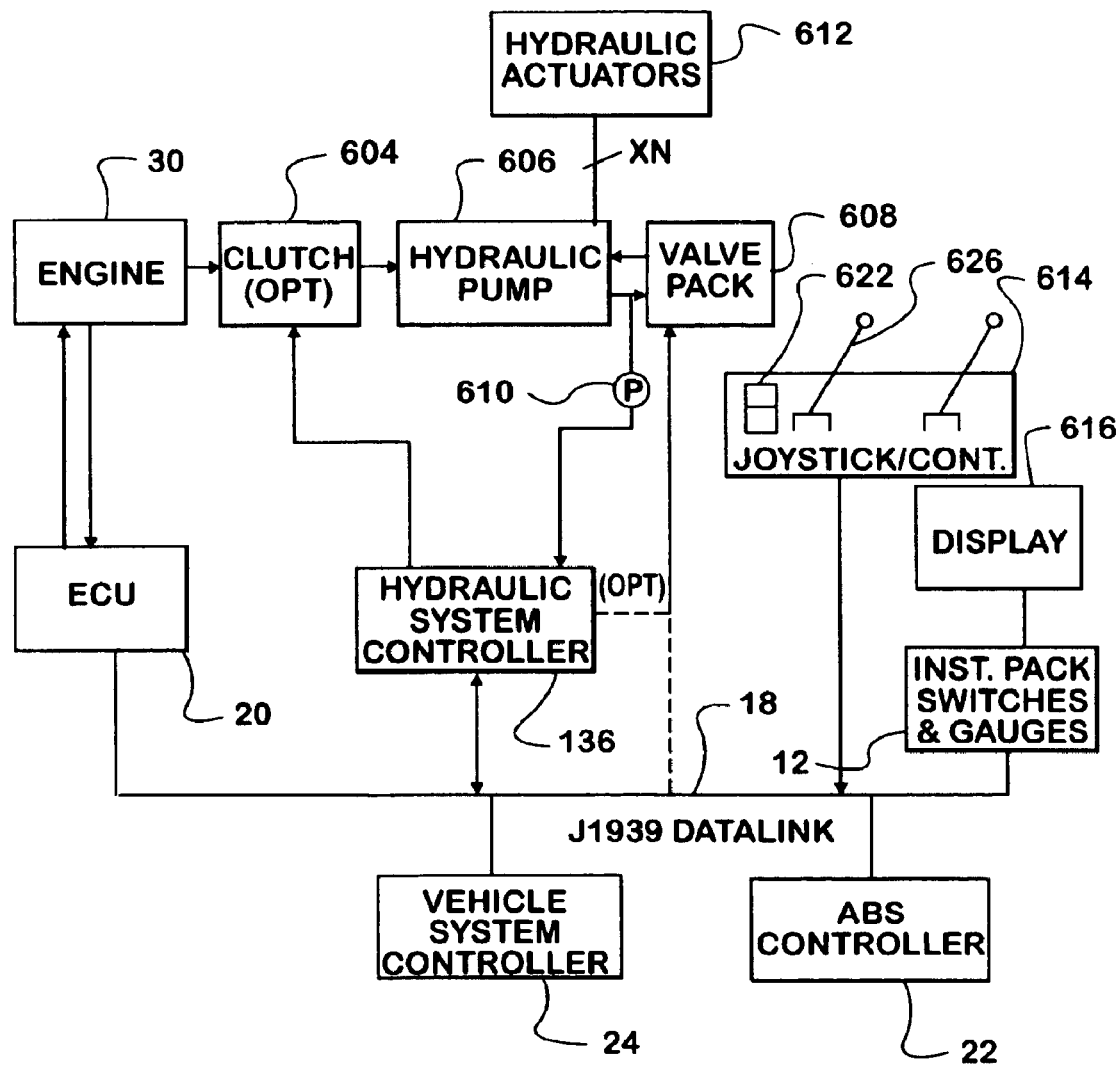
FIGS. 6A–B are block diagrams of hydraulic power take off systems implemented using the modularized system of the invention.
Figure 6B:
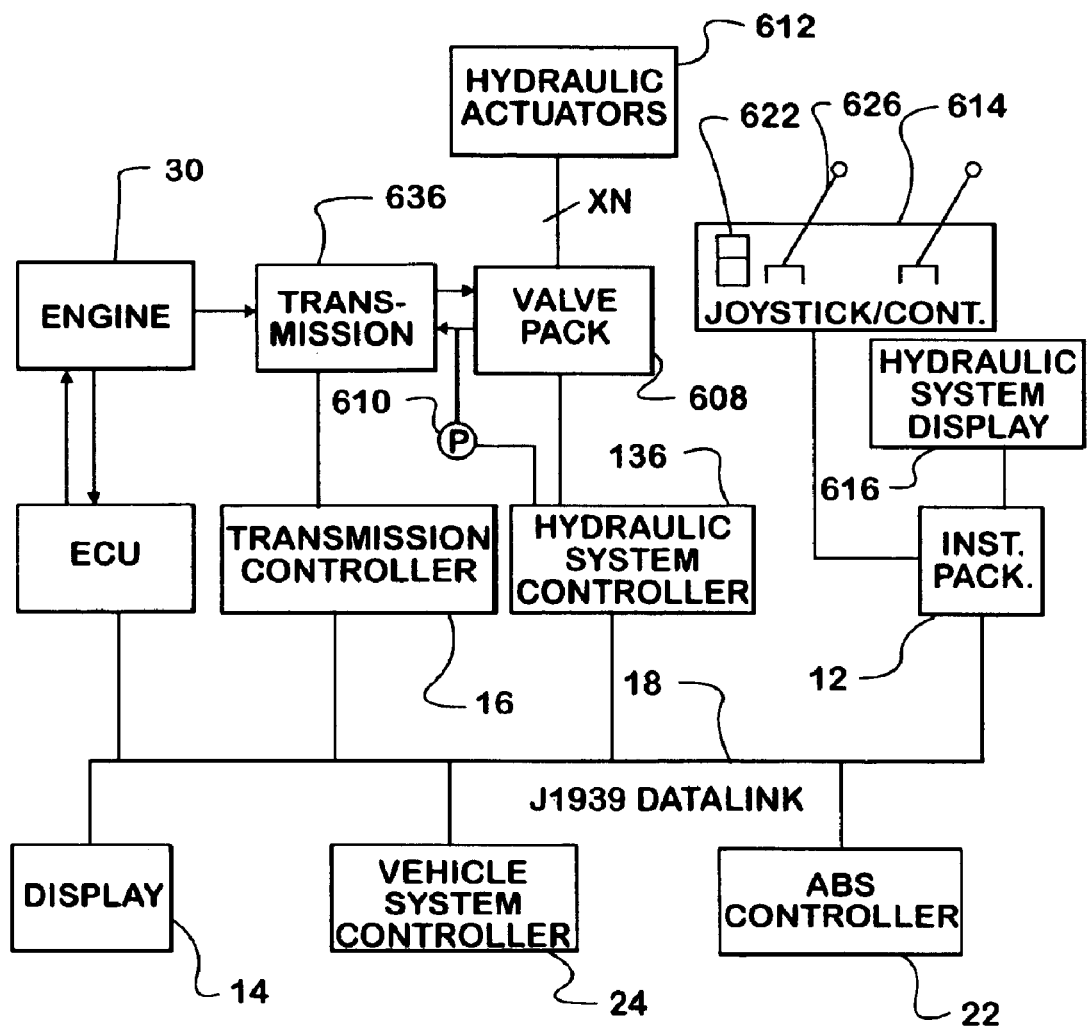

Referring now to FIGS. 6A through 9, alternative embodiments of modular power units are described. In the embodiments of FIGS. 6A through 8 the modular power units are typically implemented as intelligent valve packs which provide an analogous function to the switches of the inverter in electrical MPU 36. In FIGS. 6A–B an hydraulic system controller 136 implements an hydraulic power system providing pressurized hydraulic fluid to a plurality of hydraulic actuators 612, such as may be found in a trash compacting unit and as might be installed on a truck. In the embodiment of FIG. 6A the hydraulic pump 606 is an auxiliary device. In the embodiment of FIG. 6B, an automatic transmission 636 is tapped as a source of hydraulic pressure. An operator control station is provided by a joystick controller unit 614 which provides two joystick controller levers 626 and an on/off switch 622. In implementing a power take off system where hydraulic pressure is generated by an auxiliary pump, the output shaft of an engine 30 may be coupled by a clutch 604 to an hydraulic pump 606. Clutch 604 is in turn actuated by hydraulic system controller 136 in response to the state of on/off switch 622, output pressure from hydraulic pump 606 as detected by a pressure sensor 610 and the positions of joystick controller lever 626.

In either hydraulic system, hydraulic system controller 136 may control a plurality of valves in a valve pack 608 which selectively couple hydraulic fluid to hydraulic actuators 612. However, it is preferred that valve pack 608 itself be an intelligent device coupled directly to data link 18. Joystick controller 614 and display 616 are coupled to instrument package 12 and provide the means to control the actuators and to indicate status of the system, such as available pressure. Pressure signals from pressure sensor 610 are returned to hydraulic system controller 136 and may be transmitted over the J1939 data link 18 for receipt by instrument package 12 for eventual display on display 616. For a hydraulic system modularity is achieved by mounting the pump to the front of the engine. The pump is preferably gear driven.

Figure 7:
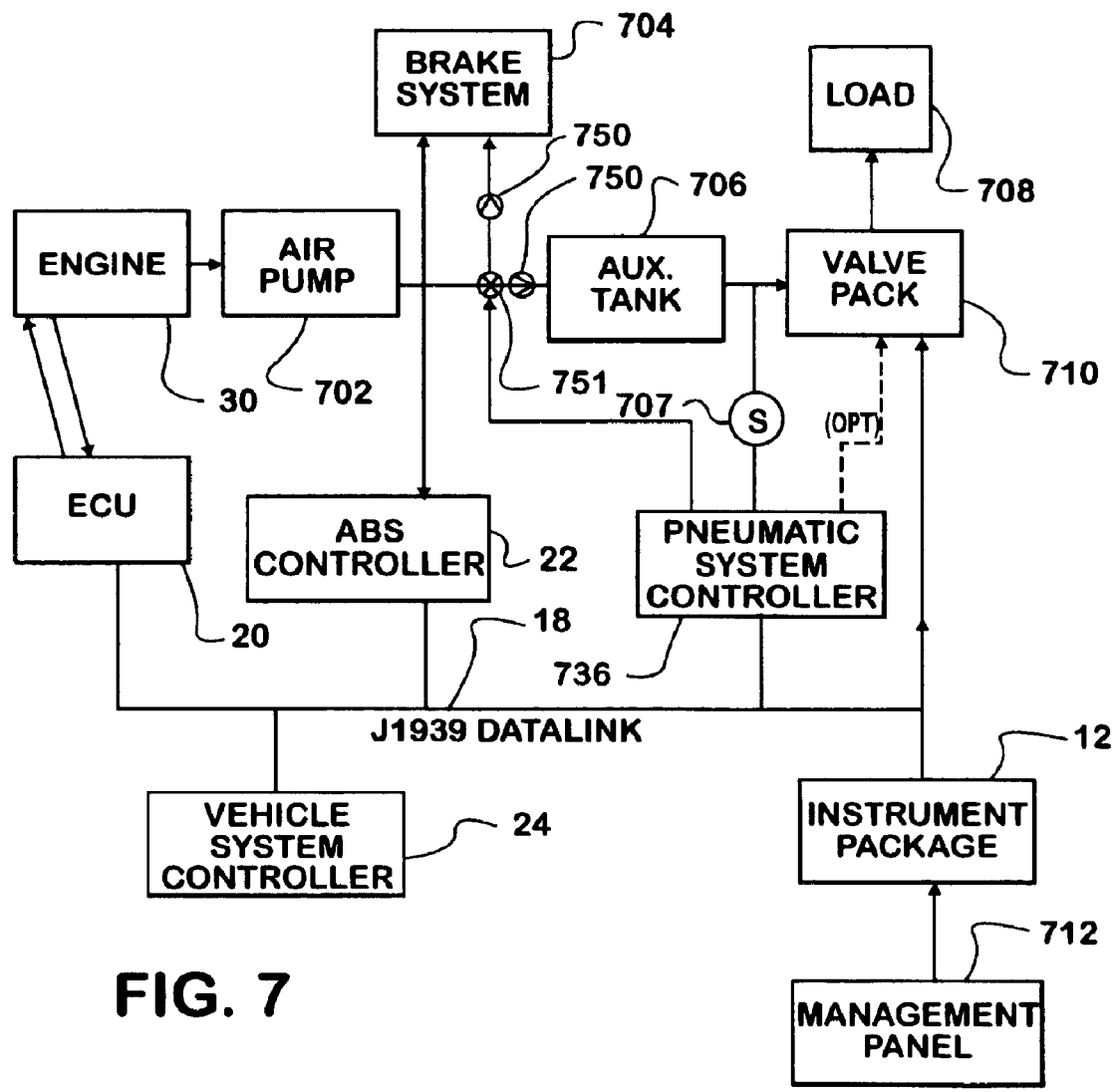
FIG. 7 is a block diagram of a first pneumatic power take off system implemented using the modularized system of the invention.

FIG. 7 illustrates a pneumatic power take off implementation of the invention. Trucks are conventionally equipped with air brake systems 704 which operate off of air pressure provided from an air pump 702 through a check valve 750. Air brake systems 704 are controlled by an ABS controller 22. Pneumatic pressure for power take off is staged through an auxiliary air storage tank 706 which is pressurized from air pump 702 by a check valve 750. Air pressure in auxiliary tank 706 is reported by an air pressure sensor 707 to pneumatic system controller 736, which in turn transmits the data over the J1939 bus 18 for receipt by instrument and switch bank 12 for display on a management panel 712 and for use by ECU 20 in determining periods to operate air pump 702 and for use of pneumatic system controller 736 in determining when to operate a valve 751, to divert air to auxiliary tank 706. Management panel 712 provides an interface through which an operator activates pneumatic system controller 736 by signals transmitted over J1939 link 18. Pneumatic system controller 736 includes solenoids for actuation of a plurality of valves in a valve pack 710 connected to receive compressed air over an air line from auxiliary tank 706. Valve pack 710 selectively couples compressed air from auxiliary tank 706 to a load 708, which may comprise air driven tools such as an air driven drill.

Figure 8:
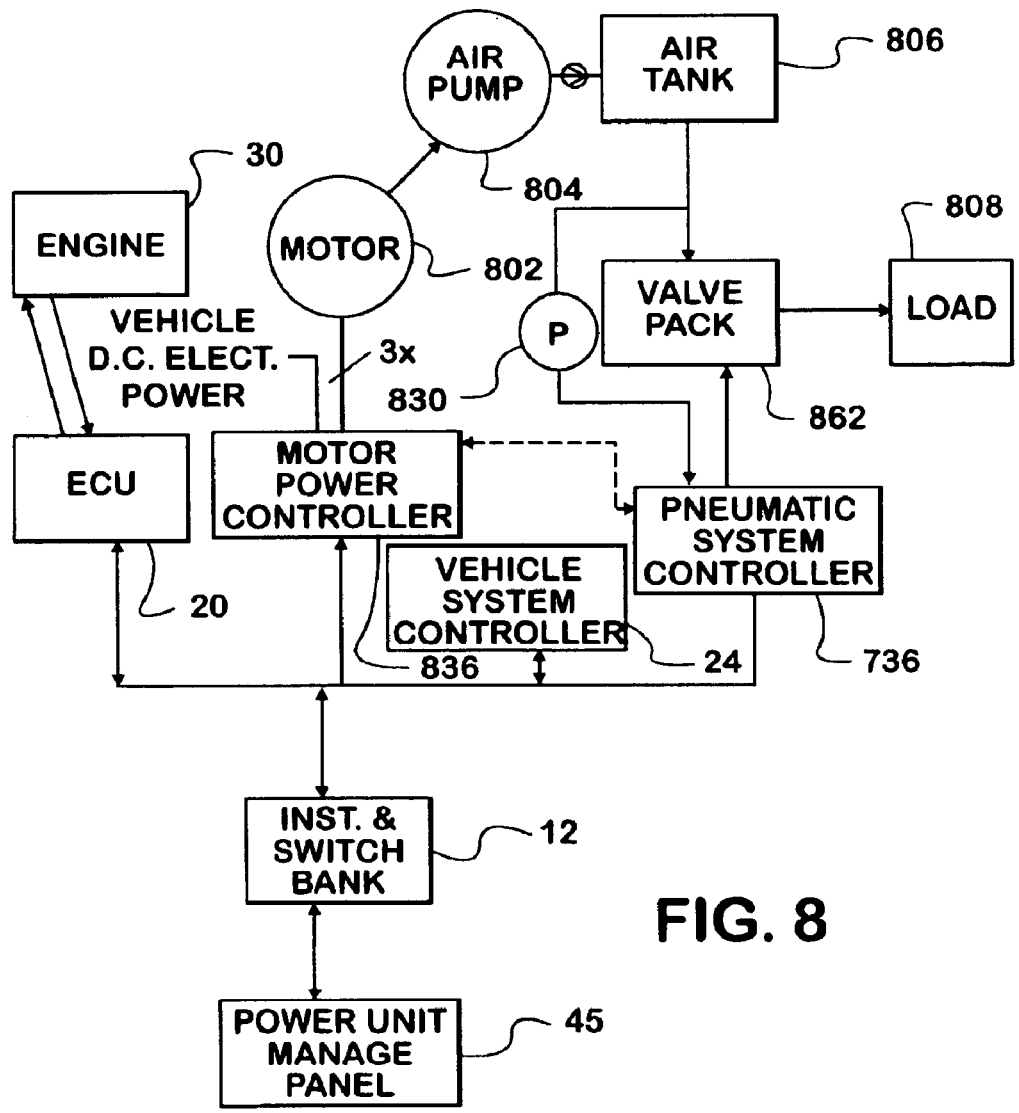
FIG. 8 is a block diagram of a compound electric/pneumatic power take off system implemented using the modularized system of the invention.

In FIG. 8 a mixed or compound power take off system relying on two MPU type units, motor 836 and pneumatic system controller 736 is illustrated. The compound power take off system is an exemplary system having a pneumatically driven load powered by air pressured from an auxiliary air compression system. The air compression system is in turn driven by a electric motor 802. Motor power controller 36 provides three phase alternating current at variable frequencies as required to drive an air pump 804 at the speed required to meet air pressure demands of load 808. Motor power controller 36 provides conversion of the vehicle's D.C. power to drive a synchronous motor 802. Motor 802 in turn drives an air pump 804 which supplies compressed air to an air tank 806. The air pressure in air tank 806 is measured by a sensor 830. Sensor 830 transmits pressure readings reports over data link 18 for the use of either the vehicle system controller 24 or of one of motor power controller 836 or pneumatic system controller 736. Motor power controller 836 is programmed to maintain a target pressure in air tank 806 and operates in response to drops in pressure received either directly from the sensor or as a formatted message from vehicle system controller 24 or pneumatic system controller 736. Motor power controller 836 operates in response to user requests entered over a power unit management panel 45 connected to instrument and switch bank 12. Pneumatic system controller 736 provides actuation signals to a valve pack 862 which couples air from air tank 806 to air actuated devices (load) 808. Motor power controller 836 may operate entirely in response to requests originating with pneumatic system controller 736, which in turn are based on user inputs relating to control of load 808. The rate of air usage may be used to control the speed at which pump 804 is operated with motor power controller 836 varying the output frequency of power to motor 802.

Figure 9:
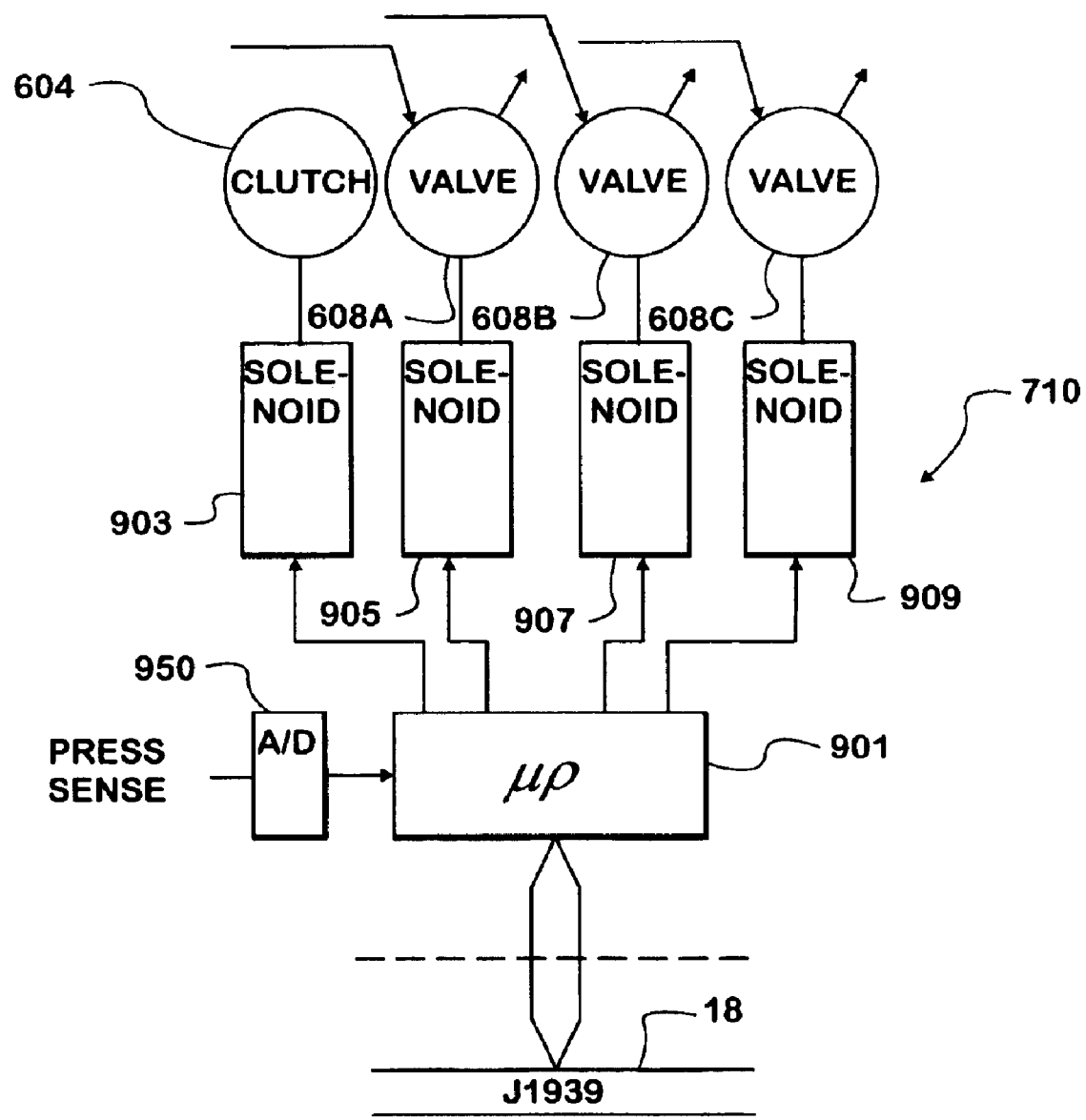
FIG. 9 is a block diagram of a pneumatic or hydraulic power take off control unit.

FIG. 9 illustrates an implementation of an MPU as an hydraulic or pneumatic valve pack, possibly including pressure sensing. Valve pack 710 comprises a microprocessor 901 which handles communications over J1939 bus 18 and which provides actuation signals to each of a plurality of solenoids 903, 905, 907 and 909. Solenoids 903, 905, 907 and 909 in turn control the position of clutch 604 and valves 608A–C. Microprocessor 901 can receive a pressure signal over an A/D converter 950 when the A/D converter is connected to receive a pressure signal from an analogue pressure signal source.

The invention provides the components for implementing a fully modularized power take off system. Modular power units control the translation of vehicle power in electrical or mechanical translate it into a form suitable for application to a load. The modular power units are adapted to attach to a convenient point in the vehicle and for communication after connection to a vehicle control system. An interface is made modular by sizing to readily fit a heavy duty vehicle control panel and to communicate with a vehicle instrument package. Power sources, if required, such a pneumatic or hydraulic pumps, may be standardized and hung from the front of an engine to be powered by a gear train from the engine. Similarly a converter, such as an electrical converter, is made modular by adapting it to share space with vehicle batteries in a battery compartment or box. Power take off systems in accordance with the invention are non-the-less fully integrated with a motor vehicle control system for efficient operation supported by the vehicle's prime mover.

While the invention is shown in only one of its forms, it is not thus limited but is susceptible to various changes and modifications without departing from the spirit and scope of the invention.

What is claimed is:

1. A motor vehicle comprising:

a vehicle system power source;

a controller area network;

a modular power unit coupled to the controller area network to receive control signals, the modular power unit comprising signal decoding means for generating switching signals in response to the control signals and power application switches responsive to the switching signals for controlling selective translation of power from the vehicle system power source to a load;

at least a first vocational controller coupled to the controller area network for communication;

a modular power take off manager having an operator interface and being coupled to the vocational controller for transmitting control signals for the modular power unit over the controller area network;

a vehicle system controller coupled for communication over the controller area network, the vehicle system controller being programmed to execute a load management program using the load data from the modular power unit as input data;

an engine controller coupled for communication over the controller area network;

the load management program providing requests for increasing engine output for the engine controller with increases in load; and the load management program providing for load shedding when output demand exceeds predetermined limits.

2. A motor vehicle as set forth in claim 1, further comprising:

an engine;

the vehicle power system including a battery and a battery charging system driven by the engine;

a direct current electrical power distribution system connected to the battery and to the battery charging system allowing charge to be transferred from the battery charging system to the battery and from both the battery and the battery charging system to electrical power using devices;

the modular power unit being coupled to the direct current electrical power distribution system for receiving power, the modular power unit having an alternating current power outlet, the modular power unit including an inverter responsive to the switching signals for translating the direct current power to alternating current power;

means in the modular power unit for determining a load on the alternating current power outlet; and the modular power unit including means for transmitting the load data on the controller area network.

3. A motor vehicle as set forth in claim 1, further comprising:

an engine;

the vehicle power system further comprising a modular hydraulic pump driven by the engine; and the modular power unit being coupled to the modular hydraulic pump and including a plurality of valves for selectively coupling pressurized hydraulic fluid from the hydraulic pump to a load.

4. A motor vehicle as set forth in claim 1, further comprising:

an engine;

the vehicle power system further comprising an air pressurizing system driven by the engine; and the modular power unit being coupled to the air pressurizing system and including a plurality of valves for selectively coupling pressurized air to a load.

5. A power take off system comprising:

a vehicle prime mover;

a vehicle power system coupled to the vehicle prime mover for energization;

a vehicle controller area network including an engine controller node, for the engine prime mover and a vehicle system controller node, the engine controller node being responsive to requests from the vehicle system controller node for changing prime mover output and the vehicle system controller node being programmed to execute a load management program;

a power switching system coupled for communication over the vehicle controller area network with the vehicle system controller node, and further coupled to the vehicle power system for energization, the power switching system being under the control of a controller element which further provides for reporting loads to the vehicle system controller node;

the vehicle power system being a direct current storage, generation and distribution system; and the power switching system being coupled to the vehicle direct current storage, generation and distribution system for energization, and further including a derectifier, a step up transformer and an alternating current power outlet, all under the control of the controller element.

6. A vehicle power take off system as claimed in claim 5, further comprising:

a plurality of alternating current power outlets;

operator controls allowing selective activation of each of the plurality of alternating current power outlets.

7. A vehicle power take off system as claimed in claim 6, further comprising:

an external power connection; and means for coupling the alternating current power outlets to the external power connection.

8. A vehicle power take off system as claimed in claim 7, the load management program further comprising:

steps for shedding load should power demand exceed vehicle capacity to meet the power demand.

9. A vehicle power take off system comprising:

a vehicle prime mover;

a vehicle power system coupled to the vehicle prime mover for energization;

a vehicle controller area network including an engine controller node for the engine prime mover and a vehicle system controller node, the engine controller node being responsive to requests from the vehicle system controller node for changing prime mover output and the vehicle system controller node being programmed to execute a load management program;

a power switching system coupled for communication over the vehicle controller area network with the vehicle system controller node, and further coupled to the vehicle power system for energization, the power switching system being under the control of a controller element which further provides for reporting loads to the vehicle system controller node;

the vehicle power system further comprising an air pressurizing system driven by the vehicle prime mover; and the modular power unit being coupled to the air pressurizing system and including a plurality of valves for selectively coupling pressurized air to a load.

10. Apparatus comprising:

an engine;

a battery;

a battery changing system driven by the engine;

a direct current electrical power distribution system connected to the battery and to the battery charging system allowing charge to be transferred from the battery charging system to the battery end to other vehicle subsystems;

a controller area network;

a modular power unit coupled to the direct current electrical power system for energization and to the controller area network for communication, and having a controller element for communication over the controller area network, at least a first alternating current power outlet and means for determining load on the at least first alternating current power outlet;

a modular power unit management interface for operator use; and an instrumentation controller connected to the controller area network for communications with the modular power unit and providing for connection to the modular power unit management interface.

11. Apparatus as set forth in claim 10, further comprising:

a vehicle system controller coupled to the controller area network for communications, the vehicle system controller being programed to execute a load management program responsive to measured loads on the first alternating current power outlet.

12. Apparatus as set forth in claim 11, further comprising:

the load management program including means for requesting increased engine output from the engine controller with increases in load.

13. A motor vehicle as set forth in claim 12, further comprising:

the load management program including means for shedding load when output demand exceeds a predetermined limit.

14. A fully modularized power take off system comprising:

a power source;

a vehicle control network;

a vehicle instrument package in communication with the vehicle control network;

a modular power control unit coupled to the vehicle control network for receiving instructions and responsive thereto for translating power from the power source for application to a load;

an interface adapted to fit a vehicle control panel and to communicate the vehicle control network through the vehicle instrument package, a vehicle engine; and the power source being a power conversion device attached to the vehicle engine to be powered;

wherein the power source is a direct current electrical system and a power conversion device is an electrical inverter.

15. A fully modularized power take off system as set forth in claim 14, wherein the electrical inverter is located in a battery box with a vehicle battery.

* * * * *